US012602075B2

(12) United States Patent
Jin et al.

(10) Patent No.: US 12,602,075 B2
(45) Date of Patent: Apr. 14, 2026

(54) ELECTRONIC DEVICE

(71) Applicant: VIVO MOBILE COMMUNICATION CO., LTD., Guangdong (CN)

(72) Inventors: Ming Jin, Guangdong (CN); Chunzhao Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 157 days.

(21) Appl. No.: 18/393,010

(22) Filed: Dec. 21, 2023

(65) Prior Publication Data

US 2024/0126323 A1     Apr. 18, 2024

Related U.S. Application Data

(63) Continuation of application No. PCT/CN2022/099761, filed on Jun. 20, 2022.

(30) Foreign Application Priority Data

Jun. 25, 2021     (CN) .......................... 202110713119.3

(51) Int. Cl.
*G06F 1/16*          (2006.01)
*G06F 1/183*        (2026.01)

(52) U.S. Cl.
CPC .......... *G06F 1/1616* (2013.01); *G06F 1/1601* (2013.01); *G06F 1/1652* (2013.01); *G06F 1/1677* (2013.01); *G06F 1/183* (2013.01)

(58) Field of Classification Search
CPC combination set(s) only.
See application file for complete search history.

(56) References Cited

U.S. PATENT DOCUMENTS

| 10,887,438 B2 * | 1/2021 | Baek | ...................... | G06F 3/0412 |
| 11,003,217 B2 * | 5/2021 | Cha | ........................ | G06F 1/1681 |

(Continued)

FOREIGN PATENT DOCUMENTS

| CN | 108230937 A | 6/2018 |
| CN | 108259649 A | 7/2018 |

(Continued)

OTHER PUBLICATIONS

International Search Report and Written Opinion for Application No. PCT/CN2022/099761, dated Sep. 21, 2022, 8 Pages.

(Continued)

*Primary Examiner* — Lisa Lea-Edmonds
(74) *Attorney, Agent, or Firm* — BROOKS KUSHMAN P.C.

(57)          ABSTRACT

An electronic device is provided. The electronic device includes: a frame; a flexible shell and a flexible screen, where a first end of the flexible shell is rolled in the frame, a second end of the flexible shell is connected to a first end of the flexible screen, and a second end of the flexible screen is disposed on the first surface; and a first sliding structure, where the first sliding structure includes a first sliding rail and a first sliding member slidably engaged with the first sliding rail, the first sliding rail is arranged on the first surface, and the first sliding member is fixed on a side of the flexible screen facing the frame; where the electronic device has an unfolded state and a folded state, and is switched between the unfolded state and the folded state.

12 Claims, 4 Drawing Sheets

(56) References Cited

U.S. PATENT DOCUMENTS

| | | | |
|---|---|---|---|
| 11,561,576 B2 * | 1/2023 | Kang | H04M 1/026 |
| 11,561,582 B2 * | 1/2023 | Kim | G06F 1/1624 |
| 11,755,073 B2 * | 9/2023 | Kim | H04M 1/0237 |
| | | | 361/749 |
| 11,849,060 B2 * | 12/2023 | Zhang | H04M 1/0268 |
| 11,940,842 B2 * | 3/2024 | Kang | G06F 1/16 |
| 11,997,803 B2 * | 5/2024 | Kang | G09F 9/30 |
| 12,072,734 B2 * | 8/2024 | Kang | G06F 1/1624 |
| 12,101,896 B2 * | 9/2024 | Lim | G06F 1/1624 |
| 12,117,870 B2 * | 10/2024 | Pyo | G06F 1/1652 |
| 12,124,298 B2 * | 10/2024 | Chun | G06F 1/1616 |
| 12,143,524 B2 * | 11/2024 | Kim | H04M 1/0262 |
| 12,144,132 B2 * | 11/2024 | Gao | G06F 1/1652 |
| 12,166,910 B2 * | 12/2024 | Kwak | G06F 1/1677 |
| 12,169,424 B2 * | 12/2024 | Shin | G06F 1/1652 |
| 12,200,350 B2 * | 1/2025 | Ku | G06F 3/0481 |
| 12,210,387 B2 * | 1/2025 | Kwak | G06F 1/1624 |
| 12,261,972 B2 * | 3/2025 | Lee | G06F 1/1652 |
| 12,267,451 B2 * | 4/2025 | Jeon | H04M 1/035 |
| 12,277,287 B2 * | 4/2025 | Kim | G06F 3/0418 |
| 12,279,388 B2 * | 4/2025 | Kim | H01Q 1/22 |
| 12,284,300 B2 * | 4/2025 | Song | H04M 1/0237 |
| 12,326,757 B2 * | 6/2025 | Choi | G06F 3/0482 |
| 12,336,119 B2 * | 6/2025 | Park | H04M 1/0268 |
| 2012/0075782 A1 | 3/2012 | Wu et al. | |
| 2017/0290177 A1 | 10/2017 | Wang | |
| 2019/0297736 A1 * | 9/2019 | Xu | H05K 1/028 |
| 2020/0249722 A1 * | 8/2020 | Cha | G06F 1/1681 |
| 2020/0371558 A1 * | 11/2020 | Kim | H04M 1/0237 |
| 2021/0044683 A1 * | 2/2021 | He | G06F 1/1652 |
| 2022/0019261 A1 * | 1/2022 | Kang | H01Q 1/243 |
| 2022/0104369 A1 | 3/2022 | Yao | |
| 2022/0113765 A1 * | 4/2022 | Kang | G06F 1/16 |
| 2022/0151091 A1 * | 5/2022 | Kang | G06F 1/1677 |
| 2022/0183173 A1 * | 6/2022 | Kim | H05K 5/0217 |
| 2022/0210253 A1 * | 6/2022 | Kwak | G06F 3/0412 |
| 2022/0232716 A1 * | 7/2022 | Lim | H10K 77/00 |
| 2022/0240400 A1 * | 7/2022 | Zhou | H05K 5/0217 |
| 2022/0317736 A1 | 10/2022 | Li | |
| 2023/0040057 A1 * | 2/2023 | Seo | G06F 1/1652 |
| 2023/0109963 A1 | 4/2023 | Feng | |
| 2023/0144130 A1 * | 5/2023 | Kim | G06F 1/1652 |
| | | | 361/749 |
| 2023/0145655 A1 * | 5/2023 | Shin | G06F 1/1624 |
| | | | 361/807 |
| 2023/0152850 A1 * | 5/2023 | Kang | G06F 1/1686 |
| | | | 361/679.01 |
| 2023/0152859 A1 * | 5/2023 | Kang | G09F 9/301 |
| | | | 361/679.01 |
| 2023/0152865 A1 * | 5/2023 | Park | H01Q 3/10 |
| | | | 361/679.27 |
| 2023/0156104 A1 * | 5/2023 | Kim | H04M 1/0277 |
| | | | 455/566 |
| 2023/0176615 A1 * | 6/2023 | Choi | H04M 1/026 |
| | | | 361/679.55 |
| 2023/0247119 A1 * | 8/2023 | Jung | G06F 1/1677 |
| | | | 455/566 |
| 2023/0300451 A1 * | 9/2023 | Cheon | H04M 1/0241 |
| | | | 348/240.2 |
| 2024/0040026 A1 * | 2/2024 | She | H04M 1/0268 |
| 2024/0126323 A1 * | 4/2024 | Jin | G06F 1/1652 |
| 2024/0329914 A1 * | 10/2024 | Lee | G06F 3/1454 |
| 2024/0419217 A2 * | 12/2024 | Yan | G06F 1/1624 |
| 2025/0008673 A1 * | 1/2025 | Lim | H04M 1/0237 |

FOREIGN PATENT DOCUMENTS

| | | |
|---|---|---|
| CN | 111243438 A | 6/2020 |
| CN | 112164312 A | 1/2021 |
| CN | 112283531 A | 1/2021 |
| CN | 112732021 A | 4/2021 |
| CN | 112735282 A | 4/2021 |
| CN | 112799470 A | 5/2021 |
| CN | 113411427 A | 9/2021 |
| WO | 2016206197 A1 | 12/2016 |
| WO | 2021121118 A1 | 6/2021 |
| WO | 2021121157 A1 | 6/2021 |

OTHER PUBLICATIONS

First Office Action for Chinese Application No. 202110713119.3, dated Aug. 5, 2023, 8 Pages.
Extended European Search Report for Application No. 22827512.9, dated Sep. 18, 2024, 12 Pages.

* cited by examiner

ELECTRONIC DEVICE

CROSS-REFERENCE TO RELATED APPLICATIONS

This application is a continuation of PCT International Application No. PCT/CN2022/099761 filed on Jun. 20, 2022, which claims priority to Chinese Patent Application No. 202110713119.3 filed on Jun. 25, 2021, which are incorporated herein by reference in their entireties.

TECHNICAL FIELD

The present application belongs to the field of display technology, and specifically relates to an electronic device.

BACKGROUND

With the pursuit of perfect user experience, users have higher and higher performance requirements for electronic devices such as smartphones and tablet computers. For example, electronic devices with large screens can enable users to obtain better video viewing effects, and also allow users to have better operating experience. Electronic devices with large screens have become a development trend.

In the related art, the screen of an electronic device includes a flexible screen that can be folded. The flexible screen includes a folding portion, and a hinge mechanism can be provided at the folding portion. By folding the folding portion, the screen can be folded or unfolded to realize the screen area increase. Most of the existing mobile phones that receive screens are folding screen mobile phones that fold flexible screens.

In the process of implementing this application, the inventor found that the existing folding screen mobile phone has at least the following problems: The screen folding is always in the same place, and the screen is susceptible to cyclic stress, breaking the screen at the crease.

SUMMARY

The purpose of the present application is to provide an electronic device.

This application is implemented as follows.

An embodiment of the present application proposes an electronic device, including: a frame, including a first surface; a flexible shell and a flexible screen, where a first end of the flexible shell is rolled in the frame, a second end of the flexible shell is connected to a first end of the flexible screen, the flexible screen is arranged on an outer surface of the frame, and a second end of the flexible screen is disposed on the first surface; and a first sliding structure, where the first sliding structure includes a first sliding rail and a first sliding member slidably engaged with the first sliding rail, the first sliding rail is arranged on the first surface and extends along a sliding direction of the flexible screen, and the first sliding member is fixed on a side of the flexible screen facing the frame; where the electronic device has an unfolded state and a folded state, and is switched between the unfolded state and the folded state; in the folded state, the flexible shell is folded in the frame; and in the unfolded state, the flexible shell is unfolded on the outer surface of the frame, and under the action of the first sliding structure, and a surface area of the flexible screen on a plane where the first surface is located is larger than that of the flexible screen on the plane where the first surface is located in the folded state.

According to the electronic device provided in the embodiment of the present application, the frame further includes a second surface opposite to the first surface, and a first side surface and a second side surface connected between the first surface and the second surface, and the first end of the flexible screen passes through the first side surface and winds to the second surface or the second side surface.

According to the electronic device provided in the embodiment of the present application, an arc-shaped channel is provided between the second surface and the second side surface, at a position corresponding to the second surface, or at a position corresponding to the second side surface, a winding channel is provided in the frame, the arc-shaped channel communicates with the winding channel, and the first end of the flexible shell passes through the arc-shaped channel and wound on the winding channel.

According to the electronic device provided in the embodiment of the present application, a stop piece for limiting a winding end of the flexible housing is provided in the winding channel.

According to the electronic device provided in the embodiment of the present application, flexible dust-proof brushes are respectively provided on two opposite sides of an inner wall of the arc-shaped channel.

The electronic device provided according to the embodiment of the present application further includes a second sliding structure, where the second sliding structure includes: a second sliding rail, provided on the second surface and extending along the sliding direction of the flexible screen; and a second sliding member, slidably engaged with the second sliding rail, and is fixed on a side of the flexible screen facing the frame and/or on a side of the flexible shell facing the frame.

The electronic device provided according to the embodiment of the present application further includes: a cable, connecting the first sliding member and the second sliding member.

The electronic device provided according to the embodiment of the present application further includes: a torsion spring rotating shaft, arranged in the frame, where a first end of the cable is connected to the first sliding member, the part between the first end and the second end of the cable is connected to the second sliding member, and a second end of the cable is wound around the torsion spring rotating shaft.

According to the electronic device provided in the embodiment of the present application, rolling pieces are respectively provided between the first sliding member and the first sliding rail and between the second sliding member and the second sliding rail, to achieve rolling contact between the first sliding member and the first sliding rail and achieve rolling contact between the second sliding member and the second sliding rail.

According to the electronic device provided by the embodiment of the present application, in a sliding direction perpendicular to the flexible screen, multiple first sliding structures and multiple second sliding structures are arranged at intervals.

The electronic device provided according to the embodiment of the present application further includes: a drive structure, connected to the first sliding member and configured to drive the first sliding member to drive the flexible screen to slide along the first sliding rail.

According to the electronic device provided in the embodiment of the present application, the first sliding member is a rack; the drive structure includes a drive motor and a gear coaxially connected with an output shaft of the drive motor, and the gear meshes with the rack.

The electronic device provided according to the embodiment of the present application further includes: a magnetic attraction layer, provided on the back of the flexible screen; and a protective layer, arranged on the back of the flexible screen and between the flexible screen and the magnetic attraction layer.

The electronic device provided according to the embodiment of the present application further includes: a flexible glass layer, arranged on the outer surface of the flexible screen, where the first side surface is in a convex arc-shaped structure, the two sides of the first side surface are correspondingly in smooth transition connection with the first surface and the second surface, and the flexible glass layer is located at the first side surface and forms an arc suitable for the first side surface.

Additional aspects and advantages of this application will be set forth in part in the following description, and will become apparent in part from the following description, or may be learned from practice of this application.

BRIEF DESCRIPTION OF DRAWINGS

The foregoing and/or additional aspects and advantages of this application will become apparent and readily understandable from the descriptions of the embodiments with reference to the following accompanying drawings.

Figure 1:
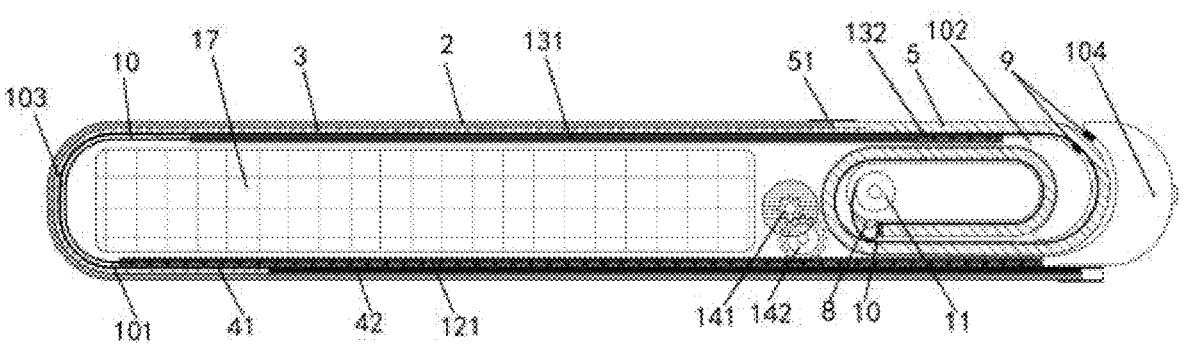
FIG. 1 is a schematic cross-sectional view of an electronic device in a folded state according to an embodiment of the present application.

Reference numerals in the accompanying drawings are as follows:

101: first surface; 102: second surface; 103: first side surface; 104: second side surface; 2: flexible screen; 3: protective layer; 41: first magnetic attraction layer; 42: second magnetic attraction layer; 5: flexible shell; 51: dispensing sealing strip; 6: arc-shaped channel; 7: winding channel; 8: stop piece; 9: flexible dust-proof brush; 10: cable; 11: torsion spring rotating shaft; 121: first sliding rail; 122: first sliding member; 131: second sliding rail; 132: second sliding member; 141: drive motor; 142: gear; 15: rolling piece; 16: button; 17: battery.

DETAILED DESCRIPTION

The following describes in detail embodiments of this application. Examples of the embodiments are illustrated in the accompanying drawings. Reference numerals which are the same or similar throughout the accompanying drawings represent identical or similar elements or elements having identical or similar functions. The embodiments described below with reference to the accompanying drawings are exemplary and only used to explain this application, and cannot be understood as a limitation on this application. All other embodiments obtained by a person of ordinary skill in the art based on the embodiments of this application without creative efforts shall fall within the protection scope of this application.

Features of terms "first" and "second" in the specification and claims of this application may explicitly or implicitly include one or more such features. In the descriptions of this application, unless otherwise specified, "multiple" means two or more. In addition, in the specification and the claims, "and/or" represents at least one of connected objects, and a character "/" generally represents an "or" relationship between associated objects.

In the description of the present application, it should be understood that the orientations or positional relationships indicated by the terms "thickness", "front", "rear", "top", "inner", "outer", and the like are based on those shown in the accompanying drawings, and is only for the convenience of describing the present application and simplifying the description, and this does not indicate or imply that the referred apparatus or element must have a specific orientation, be constructed and operated in a specific orientation, and thus should not be construed as limiting the present application.

In the descriptions of the embodiments of this application, unless otherwise specified and defined explicitly, the terms "mount", "connect", and "join" should be understood in their general senses. For example, they may refer to a fixed connection, a detachable connection, or an integral connection, may refer to a mechanical connection or an electrical connection, and may refer to a direct connection, an indirect connection via an intermediate medium, or an internal communication between two elements. A person of ordinary skill in the art can understand specific meanings of these terms in this application as appropriate to specific situations.

An electronic device according to an embodiment of the present application is described below with reference to FIG. 1 to FIG. 8.

Figure 2:
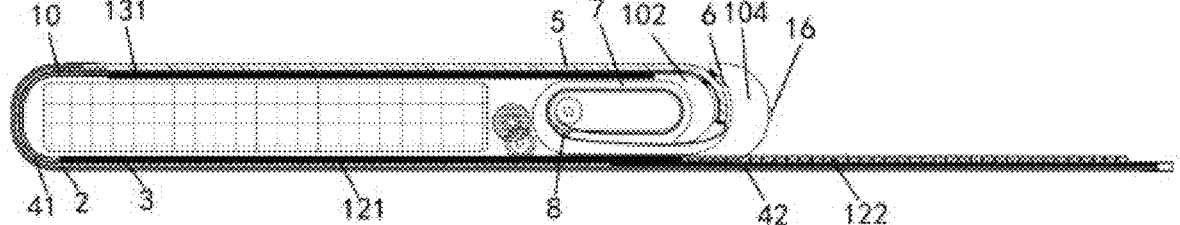
FIG. 2 is a schematic cross-sectional view of an electronic device in an unfolded state according to an embodiment of the present application.

As shown in FIG. 1 and FIG. 2, according to some embodiments of the electronic device of the present application, the electronic device includes: a frame, including a first surface 101; a flexible shell 5 and a flexible screen 2, where a first end of the flexible shell 5 is rolled in the frame, a second end of the flexible shell 5 is connected to a first end of the flexible screen 2, the flexible screen 2 is arranged on an outer surface of the frame, and a second end of the flexible screen 2 is disposed on the first surface 101; and a first sliding structure, where the first sliding structure includes a first sliding rail 121 and a first sliding member 122 slidably engaged with the first sliding rail 121, the first sliding rail 121 is arranged on the first surface 101 and extends along a sliding direction of the flexible screen 2, and the first sliding member 122 is fixed on a side of the flexible screen 2 facing the frame;

In this embodiment, the electronic device has an unfolded state and a folded state, and is switched between the unfolded state and the folded state; referring to FIG. 1, in the folded state, the flexible shell 5 is folded in the frame; and referring to FIG. 2, in the unfolded state, the flexible shell 5 is unfolded on the outer surface of the frame, and under the action of the first sliding structure, and a surface area of the flexible screen 2 on a plane where the first surface 101 is located is larger than that of the flexible screen 2 on the plane where the first surface 101 is located in the folded state.

In this embodiment, the frame is a supporting member for supporting and fixing the flexible screen 2, the flexible shell 5 and the first sliding structure. The flexible screen 2 is movably laid on the outer surface of the frame, and the second end of the flexible screen 2 is located on a side of the first surface 101 of the frame. The first surface 101 is a side surface of the frame, and may be a display surface of the electronic device. The first end of the flexible screen 2 is connected to the second end of the flexible shell 5, and the first end of the flexible shell 5 can extend into the frame and be wound and stored inside the frame. The flexible shell 5 is a flexible structure, which is convenient for winding and storage.

In this embodiment, the sliding direction of the flexible screen 2 is the direction from the first end to the second end of the flexible screen 2. The flexible screen 2 can slide back and forth along the sliding direction on the surface of the frame, so as to realize the unfolding and folding of the flexible screen 2 corresponding to the side of the first surface 101, and then realize the switch between the folded state and the unfolded state of the electronic device. Besides, when the flexible screen 2 slides back and forth along the sliding direction on the outer surface of the frame, the flexible screen 2 drives the flexible shell 5 to move as a whole. Referring to FIG. 2, in the unfolded state, that is, when the flexible screen 2 slides more towards the side of the first surface 101, the flexible screen 2 drives the flexible shell 5 to protrude out of the frame and slide along the outer surface of the frame. Referring to FIG. 1, in the folded state, that is, when the flexible screen 2 reduces the area on the side of the first surface 101, the first end of the flexible shell 5 is wound and stored inside the frame.

In this embodiment, the flexible shell 5 is connected to the flexible screen 2. When the flexible screen 2 slidably unfolds and folds, the flexible shell 5 is wound to adapt to the sliding of the flexible screen 2 on the outer surface of the frame, so that when the flexible screen 2 slidably unfolds and folds, winding folding does not occur, and the flexible screen 2 can remain laid on the outer surface of the frame, so that the folding of the flexible screen 2 can be avoided, thereby reducing the bending damage of the flexible screen 2.

Further, the first sliding structure is provided between the flexible screen 2 and the first surface 101, which is beneficial to limit the sliding direction of the flexible screen 2 and improve the sliding smoothness and stability of the flexible screen 2. Besides, the first sliding member 122 can be further set to be connected with the end of the flexible screen 2 on the first surface 101, so that when the end of the flexible screen 2 on the first surface 101 slides out of the frame, the first sliding member 122 and the end of the flexible screen 2 protrudes out of the frame integrally, and the first sliding member 122 can also support the protruding flexible screen 2. The first sliding member 122 may be configured as a strip, that is, the length of the first sliding member 122 along the first sliding rail 121 may be greater than a predetermined length, so as to protrude partially to support the flexible screen 2.

According to the electronic device of the embodiment of the present application, the flexible screen 2 unfolds and folds by sliding the flexible screen 2 on the surface of the frame, and the screen size of the flexible screen 2 on the side of the first surface 101 can be adjusted, and the adjustment of the screen is more flexible and this can realize stepless adjustment. The first sliding structure is arranged to realize the sliding of the flexible screen 2, without the need to set up a complicated frame structure, which is conducive to simplifying the structure and reducing costs and is easy to implement.

Furthermore, in the electronic device, sliding is used to realize the adjustment of the size of the flexible screen 2, and compared with the existing folding screen where the bending stress is concentrated at a same position, in the sliding flexible screen 2 of the embodiment, the stress at the bending position can be evenly released to a region around the bending of the screen during the sliding process, and the screen is more resistant to fatigue damage. The sliding flexible screen 2 has a larger bending R angle, which can realize the setting of a flexible glass protective layer, and the protection is better than that of the protective film of the existing folding screen, the sliding flexible screen 2 does not have a folding region, which is conducive to improving the utilization of the screen, and is also conducive to reducing the weight of the apparatus to achieve a lightweight design.

Further, in this embodiment, the sliding direction of the flexible screen 2 can be the width direction of the frame or the length direction of the frame. The specific unfolding and folding directions of flexible screen 2 are not limited, as long as they can adjust the area of flexible screen 2 on a plane where one of surfaces of the frame is located.

According to another embodiment of the present application, referring to FIG. 1, the frame further includes a second surface 102 opposite to the first surface 101, and a first side surface 103 and a second side surface 104 connected between the first surface 101 and the second surface 102, and the first end of the flexible screen 2 passes through the first side surface 103 and winds to the second surface 102 or the second side surface 104.

Specifically, the frame is connected to form a hollow frame structure through connection between the first surface 101, the second surface 102, the first side surface 103 and the second side surface 104, and the first side surface 103 and the second side surface 104 are located on two opposite sides of the frame. The flexible screen 2 is movably laid on the outer surface of the frame, and the second end of the flexible screen 2 is located on the first surface 101, the first end can be located on the second surface 102, and the flexible screen 2 bypasses the outer surface of the first side surface 103.

Figure 3:
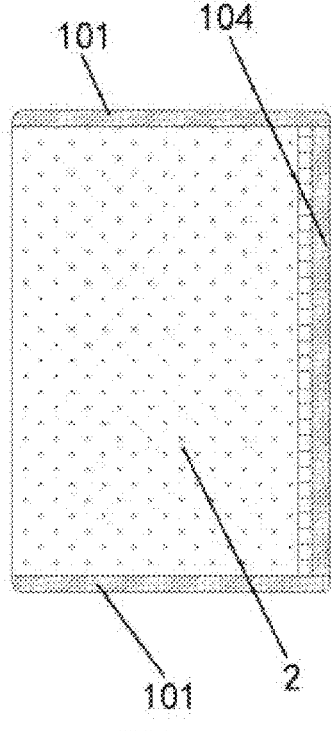
FIG. 3 is a schematic diagram of a flexible screen and a first surface of an electronic device in a folded state according to an embodiment of the present application.
Figure 4:
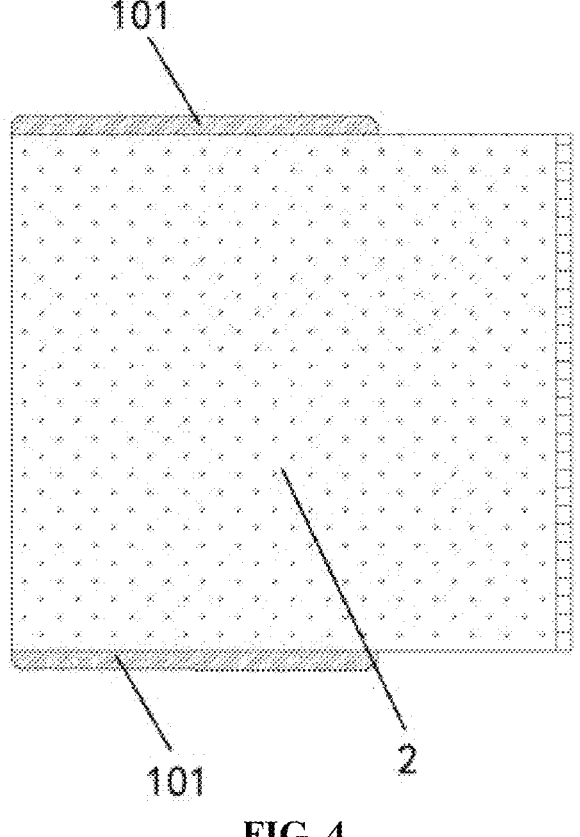
FIG. 4 is a schematic diagram of a flexible screen and a first surface of an electronic device in an unfolded state according to an embodiment of the present application.

Specifically, refer to FIG. 1 and FIG. 3, which are schematic diagrams of the flexible screen 2 in a folded state. In the folded state in this embodiment, the flexible screen 2 covers the first surface 101 and bypasses the first side surface 103 to extend to the second surface 102; the first sliding member 122 connected to the flexible screen 2 is located at a corresponding position on the first surface 101. Referring to FIG. 2 and FIG. 4, which are schematic diagrams of the flexible screen 2 in an unfolded state. In the unfolded state in this embodiment, the flexible screen 2 slides from the first end to the second end, that is, the flexible screen 2 on the second surface 102 slides towards the first surface 101, so that the flexible screen 2 on the first surface 101 faces and extends towards the second side surface 104; the first sliding member 122 connected to the flexible screen 2 slides along the first sliding rail 121 towards the second side surface 104, and the part of the first sliding member 122 protrudes from the second side surface 104 to support the flexible screen 2 protruding from the second side surface 104 on the side of the first surface 101.

According to a further embodiment of the present application, an arc-shaped channel 6 is provided between the second surface 102 and the second side surface 104, at a position corresponding to the second surface 102, or at a position corresponding to the second side surface 104, a winding channel 7 is provided in the frame, the arc-shaped channel 6 communicates with the winding channel 7, and the first end of the flexible shell 5 passes through the arc-shaped channel 6 and wound on the winding channel 7.

Referring to FIG. 2, in this embodiment, the arc-shaped 6 is located between the second surface 102 and the second side surface 104, and the opening of the arc-shaped channel 6 is located between the second surface 102 and the second side surface 104. In another embodiment, the arc-shaped channel 6 may also be provided on the second surface 102 to communicate with the winding channel 7 inside the frame. In yet another embodiment, the arc-shaped channel 6 may also be provided on the second side surface 104 to communicate with the winding channel 7 inside the frame. The specific setting position of the arc-shaped channel 6 is not limited, and the purpose is to realize the winding and storage of the flexible shell 5 in the frame.

In this embodiment, the arc-shaped channel 6 and the winding channel 7 are provided for accommodating the flexible shell 5. When the flexible screen 2 is in the folded state, the first end of the flexible shell 5 can be wound and stored in the winding channel 7 after passing through the arc-shaped channel 6; when the flexible screen 2 is in the unfolded state, the flexible shell 5 slides to the side of the first surface 101 with the flexible screen 2, and slides out of the winding channel 7.

Furthermore, in other embodiments, the end of the flexible screen 2 located on the second surface 102 can also be directly wound and stored in the winding channel 7, so that the flexible shell 5 is not required, and the entire surface of the frame is the structure of the flexible screen 2. Preferably, the flexible shell 5 is provided on the side of the second surface 102, so that the flexible screen 2 on the frame surface is smooth and continuous, and the flexible shell 5 is easier to wind and store than the flexible screen 2, and this can reduce the damage probability of the flexible screen 2. Besides, the flexible shell 5 is provided, and the opening of the frame can also be realized through the disassembly of the flexible shell 5, which can facilitate the installation and maintenance of internal components.

According to a further embodiment of the present application, referring to FIG. 1, a stop piece 8 for limiting a winding end of the flexible housing 5 is provided in the winding channel 7. Setting the stop piece 8 can limit the winding end point of the flexible shell 5 in the winding channel 7, so as to realize the control of the position of the flexible screen 2 in the folded state, which is beneficial to better unfold and fold the flexible screen 2.

Specifically, with reference to FIG. 1 and FIG. 2, in this embodiment, a cavity is provided inside the frame, the cavity communicates with the arc-shaped channel 6, and a fixed block is provided inside the cavity, so that a winding gap is defined between the fixed block and the inner wall of the cavity, and the first end of the flexible shell 5 can pass through the arc-shaped channel 6 and wind along the gap between the inner wall of the cavity and the fixed block. The stop piece 8 can be connected to the fixed block, and is correspondingly located at the position of the winding end point of the flexible shell 5.

Further, in another embodiment, the winding channel 7 can also be a channel structure that is spirally wound in an arc shape, so as to realize the winding and storage of the flexible shell 5. Alternatively, a reel can also be provided in the frame, and the first end of the flexible shell 5 can be wound on the reel. The specific structure of the winding channel 7 is not limited, and the purpose is to realize the winding and storage of the flexible shell 5.

According to a further embodiment of the present application, referring to FIG. 1, flexible dust-proof brushes 9 are respectively provided on two opposite sides of the inner wall of the arc-shaped channel 6. The arc-shaped channel 6 communicates with the outside and the winding channel 7, and the flexible shell 5 needs to pass through the arc-shaped channel 6 and enter the winding channel 7. The flexible dust-proof brushes 9 on two opposite sides of the inner wall of the arc-shaped channel 6 are correspondingly located on both sides of the flexible shell 5. The flexible dust-proof brush 9 can seal the gap between the flexible shell 5 and the inner wall of the arc-shaped channel 6.

Figure 5:
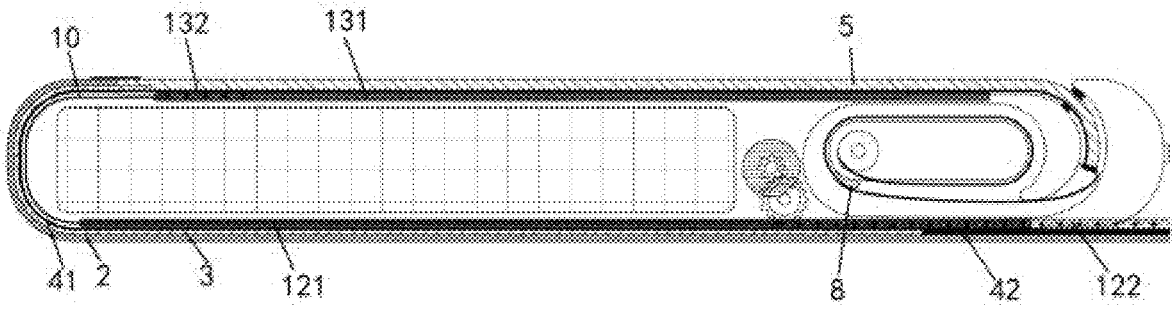
FIG. 5 is a partial schematic cross-sectional view 1 of an electronic device in an unfolded state according to an embodiment of the present application.

According to a further embodiment of the present application, referring to FIG. 1 and FIG. 5, the electronic device further includes a second sliding structure, where the second sliding structure includes: a second sliding rail 131, provided on the second surface 102 and extending along the sliding direction of the flexible screen 2; and a second sliding member 132, slidably engaged with the second sliding rail 131, and is fixed on a side of the flexible screen 2 facing the frame and/or on a side of the flexible shell 5 facing the frame.

In this embodiment, a second sliding structure is provided between the second surface 102 and the corresponding flexible screen 2 and/or flexible shell 5, which can limit the sliding of the flexible screen 2 on the side of the second surface 102, which is beneficial to smoother and more stable slidable unfolding and folding. Specifically, the second sliding rail 131 can be strip-shaped, is fixed on the second surface 102, and unfolds and folds along the sliding direction of the flexible screen 2. The second sliding member 132 can slidably move relative to the second sliding rail 131. The second sliding member 132 can be connected with the corresponding position of the flexible screen 2 to limit the sliding of the flexible screen 2 along the direction of the second sliding rail 131; the second sliding member 132 can also be connected with the corresponding position of the flexible shell 5 to limit the flexible screen 2 to slide along the direction of the second sliding rail 131; the second sliding member 132 can also be connected with the corresponding position of the flexible screen 2 and the corresponding position of the flexible shell 5 at the same time, so as to limit the flexible screen 2 to slide along the direction of the second sliding rail 131. The length of the second sliding member 132 can be flexibly set according to the stretching range of the flexible screen 2 required by the electronic device, so that the connection position of the second sliding member 132 can be flexibly set, which is not specifically limited.

According to a further embodiment of the present application, referring to FIG. 1 and FIG. 5, the electronic device further includes: a cable 10 connecting the first sliding member 122 and the second sliding member 132. Besides, the cable 10 is tensioned and connected between the first sliding member 122 and the second sliding member 132, that is, when the first sliding member 122 slides towards the second side surface 104, the cable 10 between the first sliding member 122 and the second sliding member 132 generates traction force, thereby generating traction to the second sliding member 132 to drive the second sliding member 132 to slide. Similarly, when the second sliding member 132 slides towards the second side surface 104, the second sliding member 132 also pulls the first sliding member 122 to slide through the cable 10. Furthermore, the installation of the cable 10 can generate a traction force between the first sliding member 122 and the second sliding member 132, and then the sliding member drives the flexible screen 2 to slide, thereby preventing the flexible screen 2 from being subjected to traction, which is conducive to protecting the flexible screen 2 and reducing the chance of damage.

According to a further embodiment of the present application, referring to FIG. 1 and FIG. 5, the electronic device further includes: a torsion spring rotating shaft 11, arranged in the frame, where a first end of the cable 10 is connected to the first sliding member 122, the part between the first end and the second end of the cable 10 is connected to the second sliding member 132, and a second end of the cable 10 is wound around the torsion spring rotating shaft 11.

In this embodiment, the torsion spring rotating shaft 11 is provided to fix the end of the cable 10. The torsion spring rotating shaft 11 is a torsion spring rotation damping structure. The second end of the cable 10 is wound on the torsion spring rotating shaft 11, and when the first sliding member 122 slides towards the second side surface 104, the cable 10 is pulled, and the resistance of the torsion spring rotating shaft 11 can be overcome under the traction force, to wind the cable 10 out of the torsion spring rotating shaft 11; and when the first sliding member 122 needs to slide towards the direction of the first side surface 103, the traction force on the cable 10 disappears. At this point, the torsion spring rotating shaft 11 exerts a folding force on the cable 10 under its own elastic force. Therefore, when the flexible screen 2 switches from the unfolded state to the folded state, the torsion spring rotating shaft 11 can generate folding tension on the second sliding member 132 and the first sliding member 122 through the cable 10, which is conducive to the smooth slidable folding of the flexible screen 2.

Further, in this embodiment, the torsion spring rotating shaft 11 can be arranged in the winding channel 7. Since the sliding paths of the cable 10 and the flexible shell 5 are consistent, the cable 10 can also pass through the arc-shaped channel 6 and wind around the torsion spring rotating shaft 11 inside the winding channel 7.

Further, the second end of the cable 10 can also be connected with the flexible shell 5. Specifically, the first end of the cable 10 is connected to the first sliding member 122, the position between the first end and the second end of the cable 10 is connected to the second sliding member 132 and the flexible shell 5 in turn, and the second end of the cable 10 is wound around the torsion spring rotating shaft 11. That is, the part of the cable 10 located between the second sliding member 132 and the second end is connected to the flexible shell 5. This can facilitate the orderly arrangement of the cable 10, and when the flexible screen 2 folds, the cable 10 can also generate folding tension on the flexible shell 5, which is conducive to the smooth folding of the flexible shell 5 in the winding channel 7.

Figure 6:
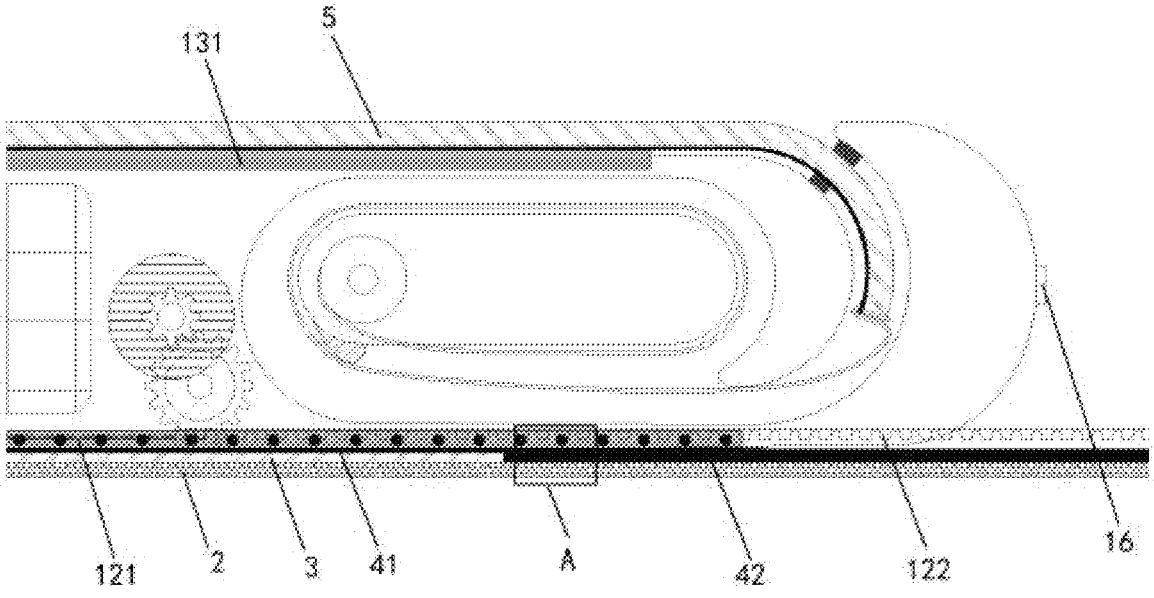
FIG. 6 is a partial schematic cross-sectional view 2 of an electronic device in an unfolded state according to an embodiment of the present application.
Figure 7:
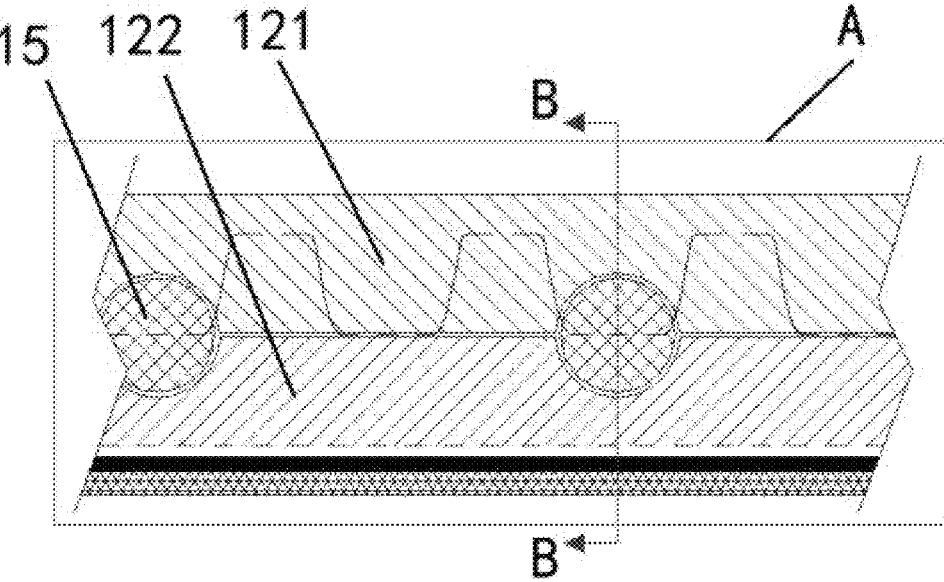
FIG. 7 is a partial schematic cross-sectional view of part A in FIG. 6 according to an embodiment of the present application.

According to a further embodiment of the present application, with reference to FIG. 6 and FIG. 7, rolling pieces 15 are respectively provided between the first sliding member 122 and the first sliding rail 121 and between the second sliding member 132 and the second sliding rail 131, to achieve rolling contact between the first sliding member 122 and the first sliding rail 121 and achieve rolling contact between the second sliding member 132 and the second sliding rail 131. That is, the rolling piece 15 is arranged between the sliding member and the sliding rail, so that the rolling contact between the sliding member and the sliding rail is conducive to reducing the sliding friction between the sliding member and the sliding rail, and reducing the sliding resistance.

Figure 8:
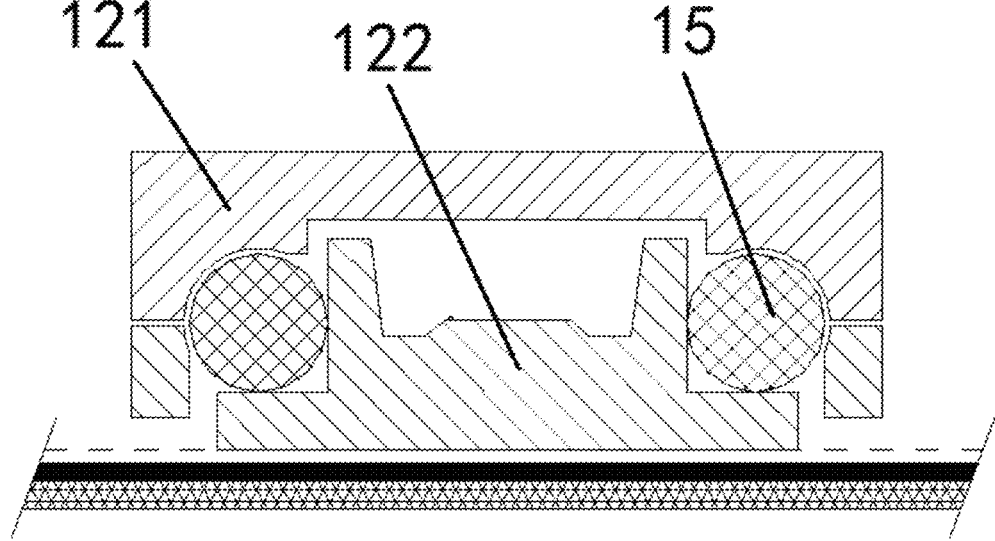
FIG. 8 is a schematic cross-sectional view of plane B-B in FIG. 7 according to an embodiment of the present application.

Specifically, referring to FIG. 8, in this embodiment, the first sliding rail 121 is a semi-enclosed structure, the first sliding member 122 is arranged inside the first sliding rail 121, and the rolling pieces 15 are arranged between the two side walls of the first sliding member 122 and the inner wall of the corresponding first sliding rail 121, so that rolling movement is formed between the side walls of the first sliding member 122 and the inner wall of the first sliding rail 121 to reduce friction.

Referring to FIG. 6 and FIG. 7, multiple rolling pieces 15 can be arranged at intervals along the extending direction of the first sliding rail 121. Referring to FIG. 6, the rolling piece 15 can be arranged on the first sliding rail 121, that is, installed and fixed through the first sliding rail 121. For example, a mounting groove can be provided on the inner wall of the first sliding rail 121, and the rolling piece 15 is placed inside the mounting groove, and the notch of the mounting groove can be set to be smaller than the diameter of the rolling piece 15, so that the fixed installation of the rolling piece 15 can be realized, and the sidewall of the first sliding member 122 can also be in contact with the rolling piece 15. The specific sliding fit structure of the first sliding rail 121 and the first sliding member 122 and the specific installation and fixing structure of the rolling piece 15 are not limited.

Referring to FIG. 1 and FIG. 5, in this embodiment, the second sliding member 132 can be set as a semi-enclosed structure, and the second sliding member 132 can be sleeved on the outside of the second sliding rail 131 and slidably fit with the second sliding rail 131. The rolling piece 15 may be disposed between the side wall of the second sliding rail 131 and the inner wall of the second sliding member 132. The rolling piece 15 can be installed and fixed on the second sliding member 132 so as to facilitate installation and fixation and realize rolling friction during the sliding process of the second sliding member 132. The specific sliding fit structure of the second sliding rail 131 and the second sliding member 132 and the specific installation and fixing structure of the rolling piece 15 are not limited either.

According to a further embodiment of the present application, in a sliding direction perpendicular to the flexible screen 2, multiple first sliding structures and multiple second sliding structures are arranged at intervals. Multiple first sliding structures are arranged parallel to each other; multiple second sliding structures are also arranged parallel to each other. In the sliding direction perpendicular to the flexible screen 2, setting multiple first sliding structures can realize the sliding connection of multiple parts between the flexible screen 2 and the first surface 101, and setting multiple second sliding structures can realize the sliding connection of multiple parts between the flexible screen 2 and the first surface 101, which is conducive to better and more stable sliding of the flexible screen 2. One or more first sliding structures and second sliding structures can be provided respectively, and the specific numbers are not limited.

According to a further embodiment of the present application, referring to FIG. 1, the electronic device further includes: a drive structure, connected to the first sliding member 122 and configured to drive the first sliding member 122 to drive the flexible screen 2 to slide along the first sliding rail 121. Setting the drive structure can realize the automatic electric control of the sliding of the first sliding member 122.

According to a further embodiment of the present application, referring to FIG. 6, the first sliding member 122 is a rack; the drive structure includes a drive motor 141 and a gear 142 coaxially connected with an output shaft of the drive motor 141, and the gear 142 meshes with the rack. In this embodiment, the gear 142 and the rack structure are provided to realize linear sliding. Specifically, the output shaft of the drive motor 141 can be connected with a drive gear 142, and a driven gear 142 is set to mesh with the drive gear 142 and the rack respectively to realize transmission; the output shaft of the drive motor 141 can also be directly connected with a gear 142 to mesh with the rack; and the specific number of gears 142 is not limited.

In this embodiment, the gear 142 and the rack structure are provided to drive the part of the flexible screen 2 on the first surface 101 to slide. The rack has a tooth surface and a plane, the tooth surface of the rack faces the gear 142, and the plane of the rack is connected to the corresponding part of the flexible screen 2. The rack has a length, which can increase the connection area with the flexible screen 2 to smoothly drive the flexible screen 2 to slide, and the rack can partially protrude from the first sliding rail 121 to support the protruded part of the flexible screen 2 in the unfolded state.

Further, the specific structure of the first sliding member 122 and the specific form of the drive structure can also be other forms, and the purpose is to realize linear sliding movement and ensure that the first sliding member 122 can support the protruded part of the flexible screen 2 in the unfolded state, which is not specifically limited.

Further, when the first sliding member 122 is a rack, referring to FIG. 6 and FIG. 8, if the first sliding rail 121 is a semi-enclosed structure, the top surface of the first sliding rail 121 is located between the rack and the gear 142, in order to realize meshing connection between the gear 142 and the rack, an opening can be provided at a position on the top surface of the first sliding rail 121 corresponding to the gear 142, and the gear 142 can mesh with the rack through the opening.

In other embodiments, the first sliding rail 121 can also be provided on both sides of the rack to limit the sliding of the rack, so that there is no obstruction between the rack and the gear 142, so as to facilitate the meshing between the gear 142 and the rack. The first sliding rail 121 can also be set as other structures, and the purpose is to limit of the sliding of the rack and the meshing transmission between the gear 142 and the rack, which is not specifically limited.

Further, in this embodiment, the drive structure may be connected to the first sliding member 122 to apply a sliding drive force to the first sliding member 122; and no drive structure may be required for the second sliding member 132. That is, the first sliding member 122 is an active sliding member, and the second sliding member 132 is a passive sliding member, which can reduce the number of drive structures and help reduce the space occupied by installation.

Further, when multiple first sliding structures are provided, the multiple first sliding structures can be connected by transmission, so that the synchronous sliding of the multiple first sliding structures can be realized through one drive structure. For example, when the first sliding member 122 is a rack, and the drive structure is a drive motor 141 and a gear 142, multiple gears 142 and multiple racks can be set to engage in one-to-one correspondence, and multiple gears 142 can be coaxially connected. Therefore, the drive motor 141 can be set to be connected to one of the gears 142, so that synchronous drive of multiple racks can be realized.

Further, with reference to FIG. 2 and FIG. 6, in this embodiment, a button is set on the surface of the frame, specifically, a button 16 can be set on the surface of the second side surface 104, and the button 16 is in signal connection to the drive structure for controlling the operation of the drive structure. Therefore, the unfolding and folding of the flexible screen 2 can be controlled through the button 16, which is convenient for operation. Further, the flexible screen 2 can be controlled to achieve any size within the telescopic range, that is, the flexible screen 2 can be controlled to achieve stepless adjustment within the telescopic range.

According to a further embodiment of the present application, referring to FIG. 1, the electronic device further includes: a magnetic attraction layer, provided on the back of the flexible screen 2; and a protective layer 3, arranged on the back of the flexible screen 2 and between the flexible screen 2 and the magnetic attraction layer. The back of the flexible screen 2 is a side surface where the flexible screen 2 connects with the frame. A magnetic attraction layer is provided on the back of the flexible screen 2, and a magnetic force is generated between the magnetic attraction layer and the frame, so that the flexible screen 2 can be bonded and fixed on the surface of the frame. The protective layer 3 is used to support the flexible screen 2 on the back of the flexible screen 2, so that the flexible screen 2 remains flat and supported. The back of the flexible screen 2 can be sequentially connected with the protective layer 3 and the magnetic attraction layer. The protective layer 3 is close to the back of the flexible screen 2 and supports the flexible screen 2. The magnetic attraction layer is close to the outer surface of the frame, and is used to attach and fix the flexible screen 2 on the surface of the frame.

According to a further embodiment of the present application, the electronic device further includes: a flexible glass layer, arranged on the outer surface of the flexible screen 2, where the first side surface 103 is in a convex arc-shaped structure, the two sides of the first side surface 103 are correspondingly in smooth transition connection with the first surface 101 and the second surface 102, and the flexible glass layer is located at the first side surface 103 and forms an arc suitable for the first side surface 103. In this embodiment, the first side surface 103 is set to be an arc-shaped structure and smoothly transitioned to connect to the first surface 101 and the second surface 102 respectively, so that when the flexible screen 2 bypasses the first side surface 103, the flexible screen 2 smoothly bypasses and a bending angle is large, so that the flexible glass layer is set on the outer surface of the flexible screen 2, which is beneficial to enhance protection.

Further, the electronic device in this embodiment further includes: a lubricating layer disposed between the magnetic attraction layer and the frame. The lubricating layer can be arranged on the outer surface of the frame or on the magnetic attraction layer, that is, the lubricating layer is located on the sliding interface between the magnetic attraction layer and the frame, and the lubricating layer can be a material layer with less friction, which is conducive to reducing sliding friction and sliding smoothly.

Further, the magnetic attraction layer on the back of the flexible screen 2 can be provided with an opening at a corresponding position of the first sliding member 122, that is, the first sliding member 122 can be directly connected to the corresponding position of the flexible screen 2, for example, bonded and connected. There is no need to arrange a magnetic attraction layer between the first sliding member 122 and the flexible screen 2. Similarly, when the second sliding member 132 is connected to the flexible screen 2, the magnetic attraction layer is also provided with an opening at a corresponding position of the second sliding member 132, and the second sliding member 132 is directly connected to the corresponding position of the flexible screen 2.

Further, the magnetic attraction layer in this embodiment is specifically divided into a first magnetic attraction layer 41 and a second magnetic attraction layer 42. The first magnetic attraction layer 41 is arranged at a position of the flexible screen 2 on the second surface 102, or is located at a position of the first side surface 103 and at a position of the flexible screen 2 on the first surface 101 close to the first side surface 103. The second magnetic attraction layer 42 is provided at a position of the flexible screen 2 on the first surface 101 except the first magnetic attraction layer 41. The thickness of the second magnetic attraction layer 42 is greater than that of the first magnetic attraction layer 41. That is, in this embodiment, the magnetic attraction layer of the flexible screen 2 located on a local part of the first surface 101 is thicker. Since a position of the magnetic attraction layer corresponding to the first sliding member 122 is provided with an opening to facilitate the direct connection between the first sliding member 122 and the flexible screen 2, the setting of the opening reduces the magnetic attraction fit area between the flexible screen 2 and the frame. Therefore, to ensure the tightness between the part of the flexible screen 2 on the first surface 101 and the frame, this embodiment proposes to set a thicker second magnetic attraction layer 42 on the local part of the flexible screen 2 on the first surface 101, to ensure that the front part of the flexible screen 2 is in close contact with the frame.

Further, in this embodiment, from the viewing angle shown in FIG. 2, there is a staggered position between the first sliding member 122 and the second magnetic attraction layer 42, instead of an up-down correspondence. The first sliding member 122 and the magnetic attraction layer do not overlap in the thickness direction.

Further, the thickness of the protective layer 3 on the back of the flexible screen 2 corresponding to the second magnetic attraction layer 42 may be smaller than the thickness of the protective layer 3 corresponding to the first magnetic attraction layer 41, to make the back of the flexible screen 2 flat.

Further, one end of the flexible screen 2 located on the second surface 102 can be connected to the second end of the flexible shell 5, and a dispensing sealing strip 51 can be provided on the outer surface of the connection position to achieve a sealed connection. The end of the protective layer 3 on the second surface 102 can also be connected with the first end of the flexible shell 5 in an up-down staggered arrangement, so as to achieve a firm and sealed connection between the flexible screen 2 and the flexible shell 5.

According to some embodiments of the present application, this embodiment provides a method of laying linear sliding rails on the front and rear straight sections of the whole machine, a flexible magnetic attraction layer is used on the bottom of the flexible screen 2 to slide the screen close to the surface of the stainless steel middle frame, and cables are used to connect the linear motion slider of the front and rear sliding rails, to ensure that the force on the flexible screen is balanced during the sliding process. In summary, the mobile phone design of horizontal sliding and expanding the screen is realized. The structural design of the mobile phone with a folding screen is shown in FIG. 3 and FIG. 4 respectively. FIG. 3 shows a front usage state of a whole machine when the screen is folded, and FIG. 4 shows a front usage state of a whole machine when the screen is unfolded.

FIG. 1 is a cross-section of a battery compartment region; when the screen is folded, the flexible shell 5 is wound in the middle frame of the mobile phone, that is, the frame, and the screen is fixed when the motor is not powered (locked position and unable to slide). FIG. 2 and FIG. 5 are cross-sections of the battery compartment region; the screen is driven by the motor to drive the rack on the rack linear sliding rail to move, the slider on the side of the battery cover and the motion slider are driven to move by the connection of the cable 10, and the flexible shell 5 is pulled out of the storage groove of the middle frame, that is, the winding channel 7 under the tension of the torsion spring rotating shaft 11. FIG. 6 is a detailed view of a winding storage mechanism of the flexible shell 5. FIG. 7 and FIG. 8 are structural principle diagrams of a rack and sliding rail mechanism of a flexible sliding screen. A precision rack linear ball sliding rail and a long slider for fixing the flexible screen 2 together play the role of controlling the movement of the screen in a straight-line direction and limiting, supporting, and protecting the screen. The protective layer 3 and the magnetic attraction layer on the back of the flexible screen 2 ensure that the screen can be tightly adsorbed on the surface of the stainless-steel middle frame, and the lubricating layer plays the role of reducing the friction coefficient between it and the middle frame.

The sliding flexible screen 2 provided in this embodiment has a relatively large bending R angle, and flexible glass can be used as the screen surface protection layer, which has better protection than the existing plastic film (PI), prolonging the service life of the screen. Compared with existing folding screen mobile phones, the bending stress of the screen is concentrated at the same position, while the sliding flexible screen 2 can evenly release the stress at the bending position to the region around the bending of the screen during the sliding process, and the screen is more resistant to fatigue damage. Compared with folding screen mobile phones with same screen sizes after unfolding, the weight is lighter, the screen size can be changed in a stepless manner; and the front and rear screens can be used at the same time. For example, during selfie, the back screen can be turned into a large selfie display screen; to fully utilize the display region of the screen, and the back screen is converted to the front screen after unfolding.

Other components of the electronic device according to the embodiment of the present application, such as the display control host and the battery 17, and operations are known to those skilled in the art, and will not be described in detail here.

Of course, in this embodiment of the present application, the electronic device may be a terminal, or other devices other than the terminal. Exemplarily, the electronic device may be a mobile phone, a tablet computer, a notebook computer, a handheld computer, a vehicle electronic device, a mobile Internet device (Mobile Internet Device, MID), an augmented reality (augmented reality, AR)/virtual reality (virtual reality, VR) equipment, a robot, a wearable device, an ultra-mobile personal computer (ultra-mobile personal computer, UMPC), a netbook or a personal digital assistant (personal digital assistant, PDA), or the like, can also be a server, a network attached storage (Network Attached Storage, NAS), a personal computer (personal computer, PC), a television (television, TV), a teller machine or a self-service machine, or the like. The embodiments of this application are not specifically limited.

In the description of this specification, the description with reference to the terms such as "an embodiment", "some embodiments", "an illustrative embodiment", "an example", "a specific example", or "some examples" means that a specific feature, a structure, a material, or a characteristic described with reference to the embodiment or example is included in at least one embodiment or example of this application. In this specification, the schematic descriptions of the above terms do not necessarily refer to the same embodiment or example. Moreover, the specific features, structures, materials, or characteristics described may be combined in a proper way in any one or more embodiments or examples.

Although the embodiments of this application have been shown and described, a person of ordinary skill in the art can understand that various changes, modifications, replacements, and variants may be made to these embodiments without departing from the principle and purpose of this application, and the scope of this application is limited by the claims and their equivalents.

The invention claimed is:

1. An electronic device, comprising:
a frame, comprising a first surface and a second surface opposite to the first surface;
a flexible shell and a flexible screen, wherein a first end of the flexible shell is rolled in the frame, a second end of the flexible shell is connected to a first end of the flexible screen, the flexible screen is arranged on an outer surface of the frame, and a second end of the flexible screen is disposed on the first surface; and
a first sliding structure, wherein the first sliding structure comprises a first sliding rail and a first sliding member slidably engaged with the first sliding rail, the first sliding rail is arranged on the first surface and extends along a sliding direction of the flexible screen, and the first sliding member is fixed on a side of the flexible screen facing the frame;
a second sliding structure, the second sliding structure comprising: a second sliding rail, arranged on the second surface, and extending along the sliding direction of the flexible screen; and a second sliding member, slidably engaged with the second sliding rail, and is fixed on a side of the flexible screen facing the frame and/or on a side of the flexible shell facing the frame;
a cable, connecting the first sliding member and the second sliding member;
wherein
the electronic device has an unfolded state and a folded state, and is switched between the unfolded state and the folded state;
in the folded state, the flexible shell is folded in the frame; and
in the unfolded state, the flexible shell is unfolded on the outer surface of the frame, and under the action of the first sliding structure, and a surface area of the flexible screen on a plane where the first surface is located is larger than that of the flexible screen on the plane where the first surface is located in the folded state.

2. The electronic device according to claim 1, wherein the frame further comprises a first side surface and a second side surface connected between the first surface and the second surface, and the first end of the flexible screen passes through the first side surface and winds to the second surface or the second side surface.

3. The electronic device according to claim 2, wherein an arc-shaped channel is provided between the second surface and the second side surface, at a position corresponding to the second surface, or at a position corresponding to the second side surface, a winding channel is provided in the frame, the arc-shaped channel communicates with the winding channel, and the first end of the flexible shell passes through the arc-shaped channel and wound on the winding channel.

4. The electronic device according to claim 3, wherein a stop piece for limiting a winding end of the flexible housing is provided in the winding channel.

5. The electronic device according to claim 3, wherein flexible dust-proof brushes are respectively provided on two opposite sides of an inner wall of the arc-shaped channel.

6. The electronic device according to claim 2, further comprising:
a flexible glass layer, arranged on the outer surface of the flexible screen, wherein the first side surface is in a convex arc-shaped structure, the two sides of the first side surface are correspondingly in smooth transition connection with the first surface and the second surface, and the flexible glass layer is located at the first side surface and forms an arc suitable for the first side surface.

7. The electronic device according to claim 1, further comprising:
a torsion spring rotating shaft, arranged in the frame, wherein a first end of the cable is connected to the first sliding member, the part between the first end and the second end of the cable is connected to the second sliding member, and a second end of the cable is wound around the torsion spring rotating shaft.

8. The electronic device according to claim 1, wherein rolling pieces are respectively provided between the first sliding member and the first sliding rail and between the second sliding member and the second sliding rail, to achieve rolling contact between the first sliding member and the first sliding rail and achieve rolling contact between the second sliding member and the second sliding rail.

9. The electronic device according to claim 1, wherein in a sliding direction perpendicular to the flexible screen, multiple first sliding structures and multiple second sliding structures are arranged at intervals.

10. The electronic device according to claim 1, further comprising:
a drive structure, connected to the first sliding member and configured to drive the first sliding member to drive the flexible screen to slide along the first sliding rail.

11. The electronic device according to claim 10, wherein the first sliding member is a rack; the drive structure comprises a drive motor and a gear coaxially connected with an output shaft of the drive motor, and the gear meshes with the rack.

12. The electronic device according to claim 1, further comprising:
a magnetic attraction layer, arranged on the back of the flexible screen; and
a protective layer, arranged on the back of the flexible screen and between the flexible screen and the magnetic attraction layer.

* * * * *